(12) United States Patent
Cheng et al.

(10) Patent No.: US 7,053,346 B2
(45) Date of Patent: May 30, 2006

(54) COMBINED MICROWAVE/FRYING APPARATUS

(75) Inventors: Feng-Jsung Cheng, Kaohsiung (TW); Kung-Jack Peng, Hsinchu Hsien (TW)

(73) Assignee: Highlight Tech System Corp., Jwudong Jenn (TW)

( * ) Notice: Subject to any disclaimer, the term of this patent is extended or adjusted under 35 U.S.C. 154(b) by 33 days.

(21) Appl. No.: 10/840,915

(22) Filed: May 7, 2004

(65) Prior Publication Data

US 2005/0258170 A1  Nov. 24, 2005

(51) Int. Cl.
*H05B 6/64* (2006.01)
(52) U.S. Cl. ..................................... 219/680
(58) Field of Classification Search ............... 219/680, 219/601, 678, 679, 687, 682, 683, 684, 685
See application file for complete search history.

(56) References Cited

U.S. PATENT DOCUMENTS

| | | | | |
|---|---|---|---|---|
| 3,961,568 A | * | 6/1976 | Jeppson | 99/339 |
| 4,409,453 A | * | 10/1983 | Smith | 219/684 |
| 5,049,711 A | * | 9/1991 | August | 219/680 |
| 5,363,749 A | * | 11/1994 | Hurley et al. | 99/403 |
| 5,767,487 A | * | 6/1998 | Tippmann | 219/440 |
| 5,802,959 A | * | 9/1998 | Benson et al. | 99/355 |
| 6,104,014 A | * | 8/2000 | Chung | 219/682 |
| 6,228,405 B1 | * | 5/2001 | Walsh et al. | 426/241 |
| 6,702,461 B1 | * | 3/2004 | Vangedal-Nielsen | 383/38 |

* cited by examiner

*Primary Examiner*—Daniel Robinson
(74) *Attorney, Agent, or Firm*—Alan D. Kamrath; Nikolai & Mersereau, P.A.

(57) ABSTRACT

A combined microwave/frying apparatus includes a frying device, a microwave-generating device, and a supporting member. The frying device includes a housing having an oil groove in an upper end thereof, the oil groove having an upwardly facing opening. The microwave-generating device includes a body having a rear end pivotally connected to a top of the housing, allowing the body to pivot relative to the housing of the frying device between an open position and a closed position. The microwave-generating device generates microwaves for heating food that is being fried in oil in the oil groove. The supporting member supports the body of the microwave-generating device in the open position. The food can be heated more uniformly in the surface and in the interior of the food. The time for frying the food is shortened while obtaining crisp fried food.

15 Claims, 7 Drawing Sheets

COMBINED MICROWAVE/FRYING APPARATUS

BACKGROUND OF THE INVENTION

1. Field of the Invention

The present invention relates to a combined microwave/frying apparatus. In particular, the present invention relates to a combined microwave/frying apparatus that cooks food by microwaves and frying.

2. Description of the Related Art

Fried food is popular as it is crisp. A typical frying device includes an oil groove for receiving oil and uses gas or electricity as the heat source for frying food in the oil. Nevertheless, it is difficult to obtain uniform heating such that it is not uncommon that the surface of food is scorched while the interior of the food is still not yet done. Further, the oil for frying deteriorates quickly at high temperature, and frying consumes a great deal of oil.

A solution is to incorporate a microwave-generating means into a frying device to provide uniform heating and to save oil. Several magnetrons are mounted inside the frying device and located below the oil groove and generate microwaves for providing an additional heating source. However, the microwaves are obstructed by a bottom wall delimiting the oil groove and thus fail to provide a satisfactory heating result. Further, the frying device malfunctions easily, as the microwave-generating means is located adjacent to the heat source for heating the oil in the oil groove.

SUMMARY OF THE INVENTION

In accordance with a first aspect of the present invention, a combined microwave/frying apparatus includes a frying device, a microwave-generating device, and a supporting member. The frying device includes a housing having an oil groove in an upper end thereof, the oil groove having an upwardly facing opening. The microwave-generating device includes a body having a rear end pivotally connected to a top of the housing, allowing the body to pivot relative to the housing of the frying device between an open position and a closed position. The microwave-generating device generates microwaves for heating food that is being fried in oil in the oil groove. The supporting member supports the body of the microwave-generating device in the open position.

In accordance with a second aspect of the present invention, a combined microwave/frying apparatus comprises a frying device and a microwave-generating device. The frying device includes a housing having an oil groove in an upper end thereof, the oil groove having an upwardly facing opening. The microwave-generating device includes a body having a rear end pivotally connected to a top of the housing, allowing the body to pivot relative to the housing of the frying device between an open position and a closed position, the body having a bottom side facing the oil groove. The microwave-generating device generates microwaves for heating food that is being fried in oil in the oil groove. An insulating member is mounted to the bottom side of the body for preventing leakage of the microwaves when the body of the microwave-generating device is in the closed position.

The food can be heated more uniformly in the surface and in the interior of the food. The time for frying the food is shortened while obtaining crisp fried food.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
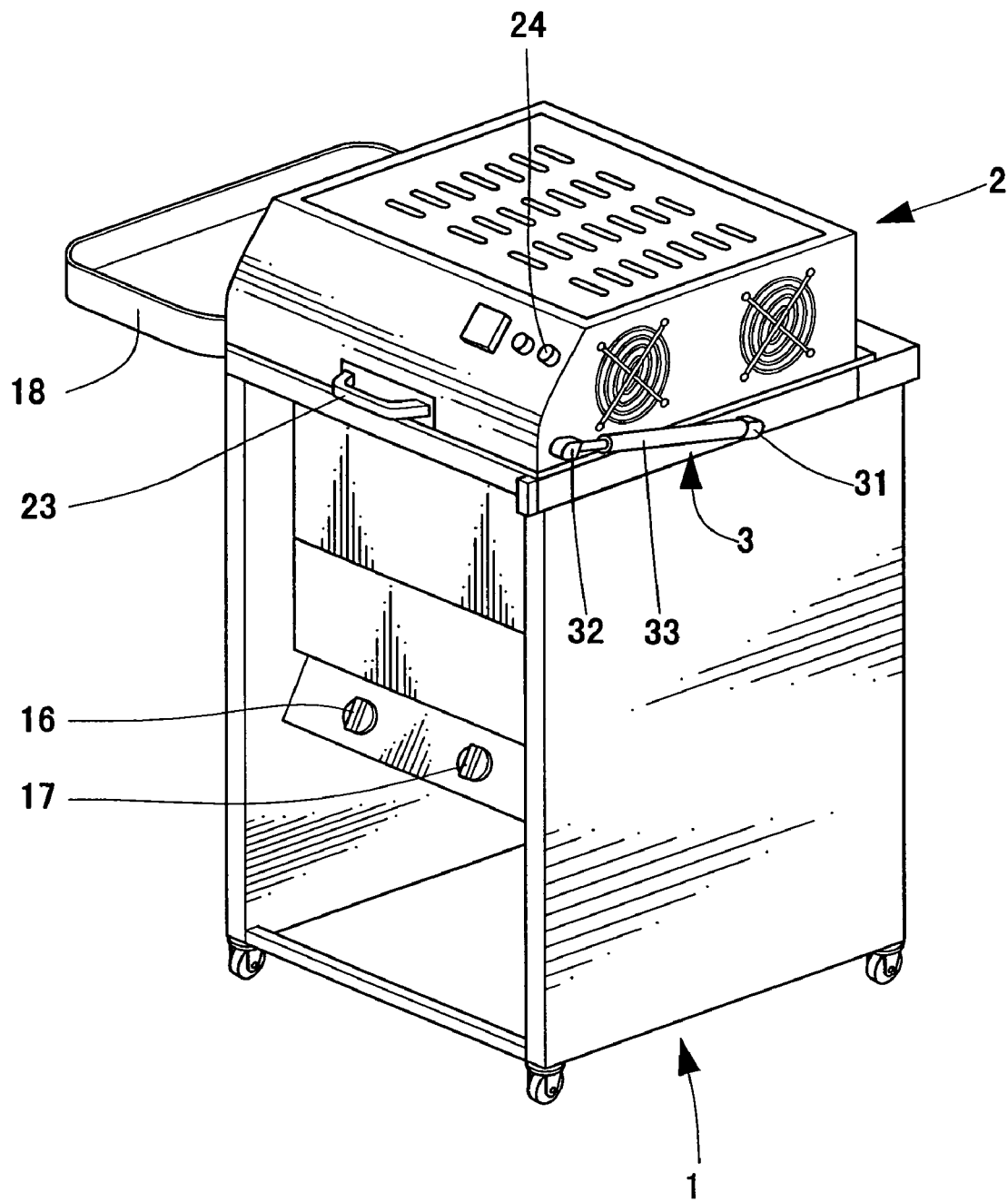
FIG. 1 is a perspective view of a combined microwave/frying apparatus in accordance with the present invention.
Figure 2:
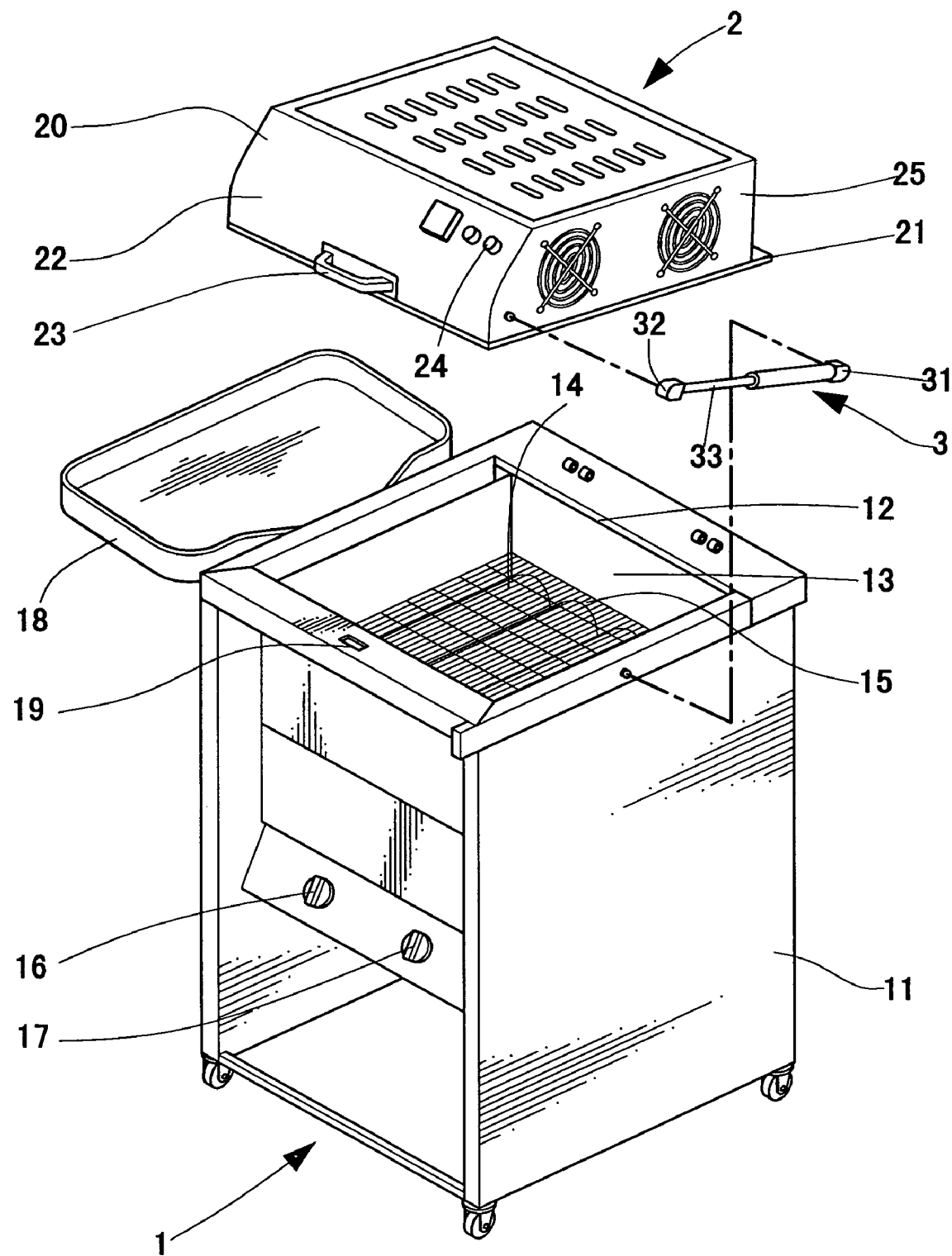
FIG. 2 is a perspective view, partly exploded, of the combined microwave/frying apparatus in accordance with the present invention.

Referring to FIG. 1, a combined microwave/frying apparatus in accordance with the present invention comprises a frying device 1, a microwave-generating device 2, and a supporting device 3. The frying device 1 includes a housing 11 having an oil groove 13 in an upper end thereof. The oil groove 13 has an upwardly facing opening 12. Mounted in the oil groove 13 are a plurality of heating tubes 14 for heating oil received in the oil groove 13. Also mounted in the oil groove 13 is a mesh 15 that is located above the heating tubes 14. The food to be fried rests on the mesh 15 during frying. A food tray 18 is attached to a side of the housing 11 for placing the fried food. In this embodiment, the frying device 1 uses a gas stove as a heating source for heating the oil in the oil groove 13 via the heating tubes 14. An ignition button 16 and a temperature-control button 17 for controlling the frying temperature are provided to a front side of the frying device 1.

The microwave-generating device 2 includes a body 20 mounted on top of the frying device 1. Namely, the body 20 is located above the oil groove 13. At least one magnetron (not shown) and at least one waveguide (not shown) are mounted in the body 20 for generating microwaves, which are conventional and therefore not described in detail. The microwaves directly heat the food that is being fried in the oil in the oil groove 13. Thus, the food can be heated more uniformly in the surface and in the interior of the food. The time for frying the food is shortened while obtaining crisp fried food without the risk of scorched surface and/or underdone interior of the food. At least one button 24 is mounted to a front side of the body 20 for activating/deactivating the microwave-generating device 2.

Figure 3:
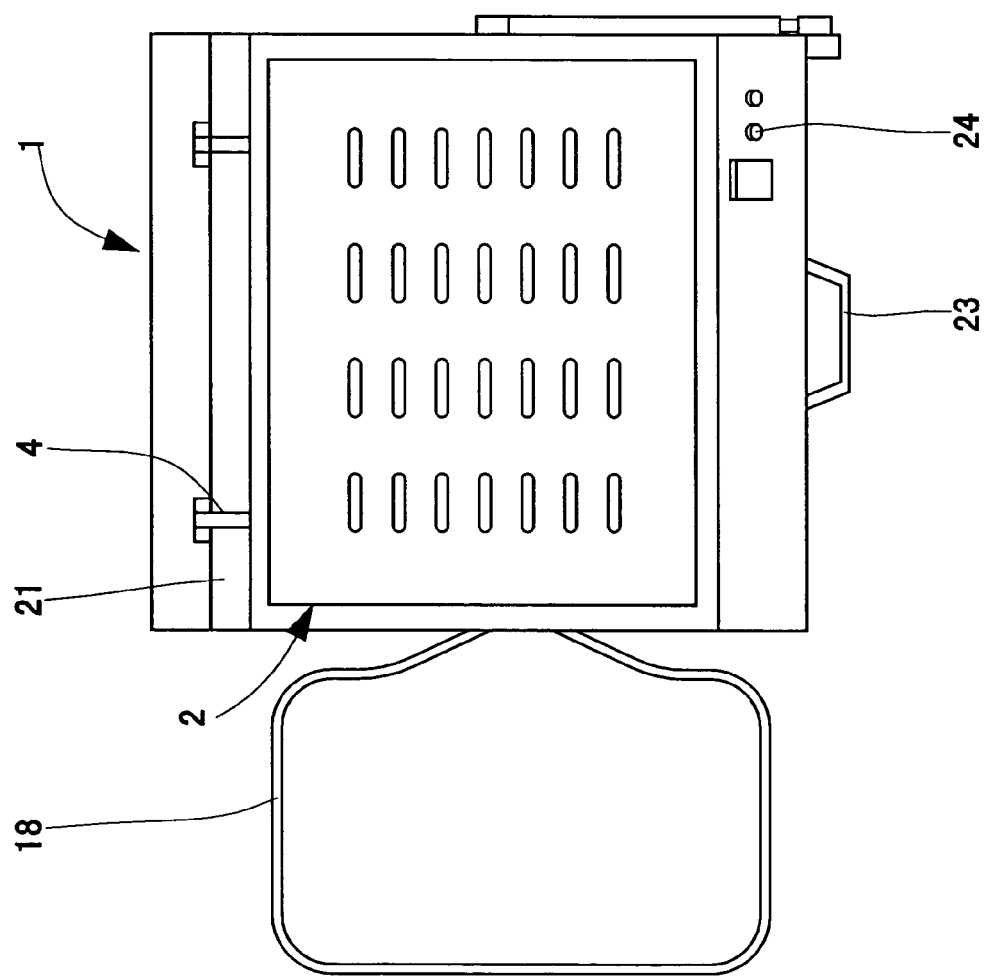
FIG. 3 is a top view of the combined microwave/frying apparatus in accordance with the present invention.
Figure 6:
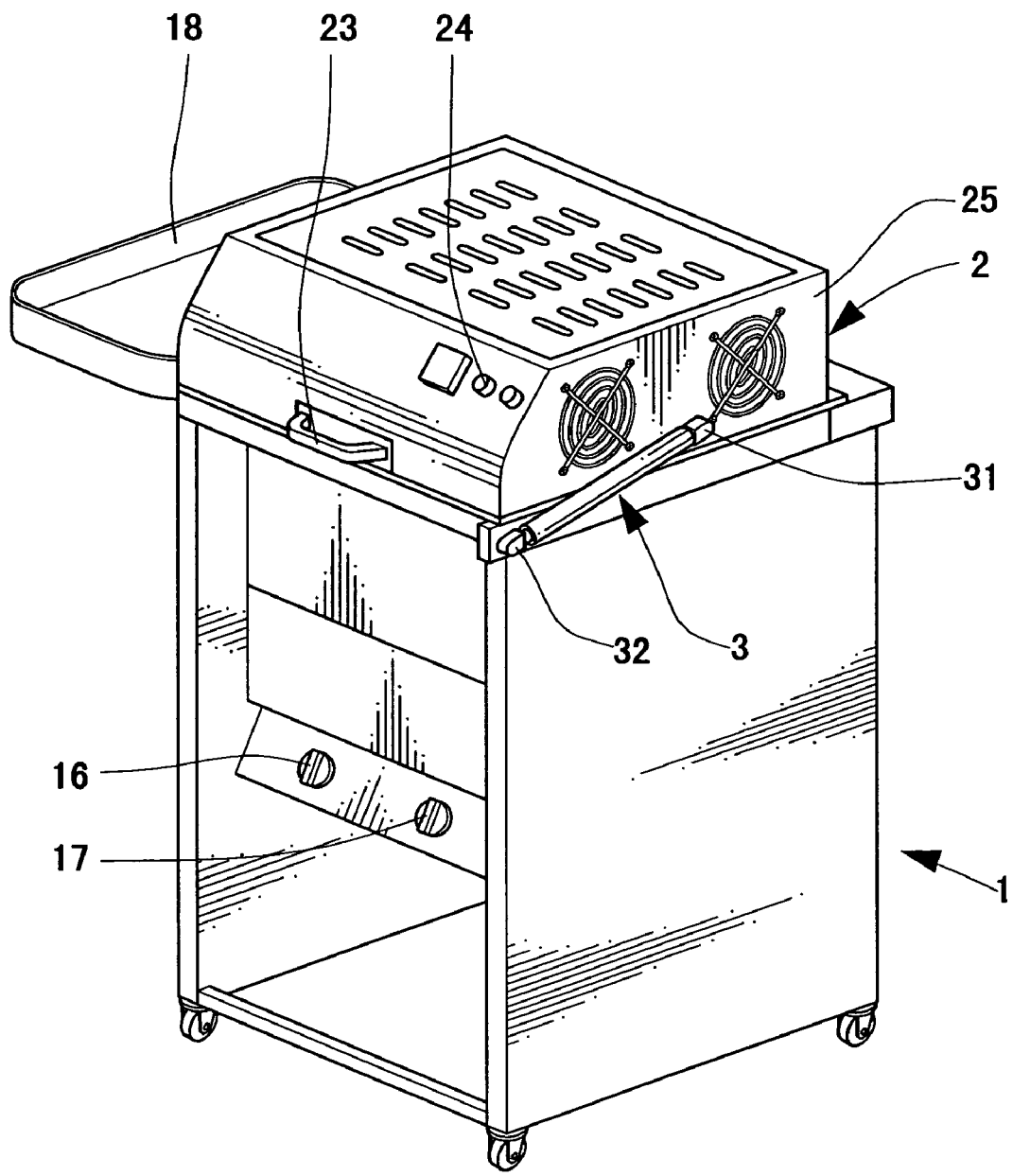
FIG. 6 is a perspective view illustrating a modified embodiment f the combined microwave/frying apparatus in accordance with the present invention.

A rear end 21 of the body 20 is pivotally connected by hinges 4 (FIG. 3) to the top of the housing 11 so that the body 20 may pivot relative to the housing 11 between an open position (FIG. 4) and a closed position (FIG. 6). A handle 23 is attached to the front side 22 of the body 20 for grasp.

The supporting device 3 is provided between the housing 11 of the frying device 1 and the body 20 of the microwave-generating device 2 for supporting the microwave-generating device 2. In this embodiment, the supporting device 3 is in the form of a telescopic pneumatic rod including a first rod 31 having an end pivoted to an intermediate portion of a side of the housing 11 of the frying device 1 and a second rod 33 having a first end slidingly received in the first rod 31 and a second end 32 pivoted to a front portion of a side 25 of the body 20 of the microwave-generating device 2. When the body 20 of the microwave-generating device 2 is pivoted relative to the housing 11 of the frying device 1 to the open position (FIG. 4), the overall length of the telescopic pneumatic rod 3 is increased for supporting the body 20 of the microwave-generating device 2. When the body 20 of the microwave-generating device 2 is pivoted relative to the housing 11 of the frying device 1 to the closed position (FIG. 6), the overall length of the telescopic pneumatic device 3 shortens. Such a telescopic pneumatic device 3 is conventional and therefore not described in detail. The telescopic pneumatic device can be a single member, e.g., a single rod for supporting the body 20 of the microwave-generating device 2 in the open position.

In use, after the food to be fried is placed into the oil in the oil groove 13, the body 20 of the microwave-generating device 2 is moved to the closed position (FIG. 6) directly on top of the oil groove 13. The ignition button 16 of the frying device 1 and the button 24 of the microwave-generating device 2 are turned on. As mentioned above, the food can be heated more uniformly in the surface and in the interior of the food. The time for frying the food is shortened while obtaining crisp fried food. After frying, the body 20 of the microwave-generating device 2 is moved to the open position (FIG. 4), and the fried food can be removed from the oil groove 13 and placed on the food tray 18. Since the microwaves directly heat the food without any obstacle between the microwaves and the food, the food can be done in a relatively short time while saving energy. Further, since the microwave-generating device 2 is located distant to the heat source for heating the oil in the oil groove 13, the risk of malfunction of the microwave-generating device 2 is reduced.

Figure 4:
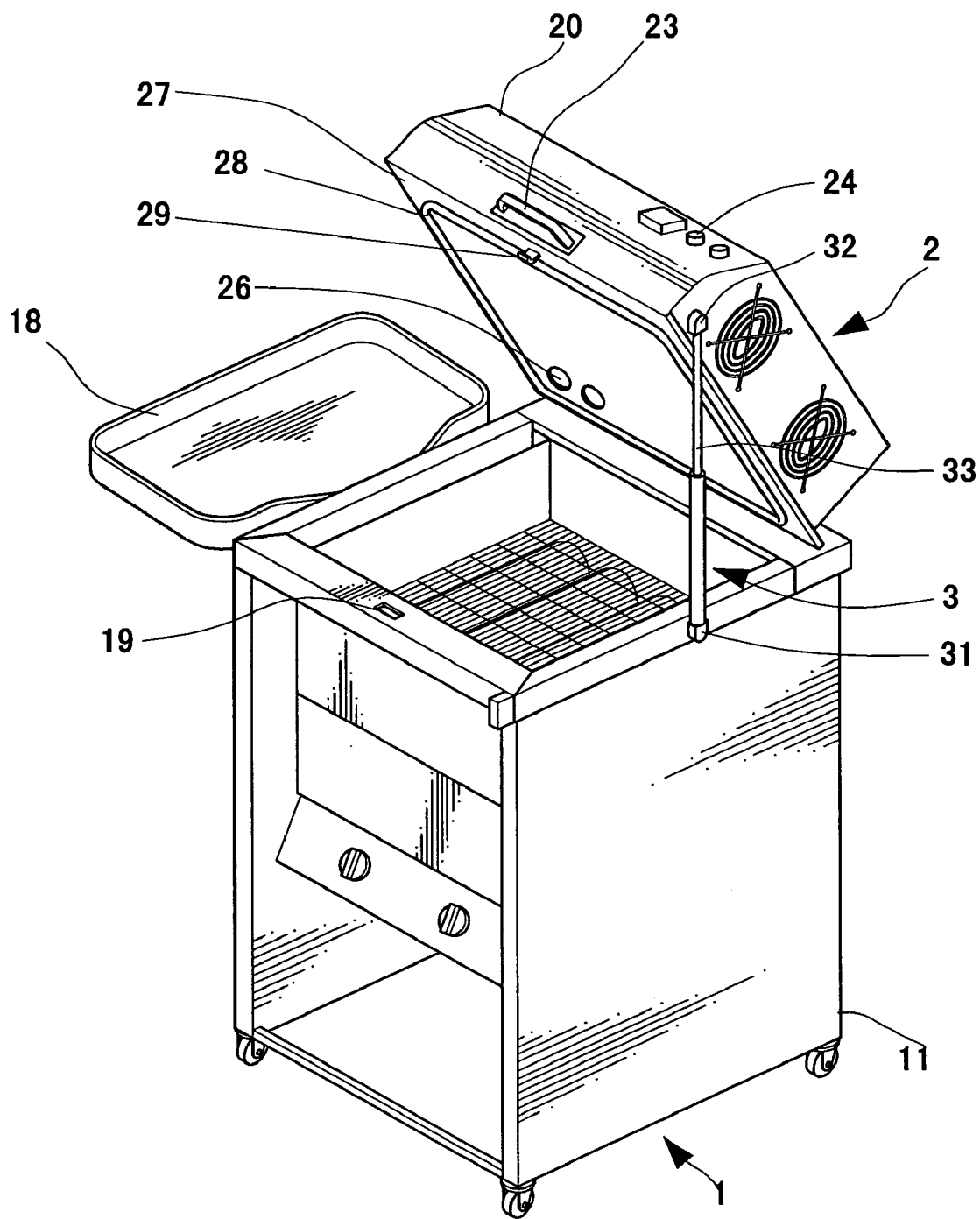
FIG. 4 is a perspective view of the combined microwave/frying apparatus in an open state.
Figure 5:
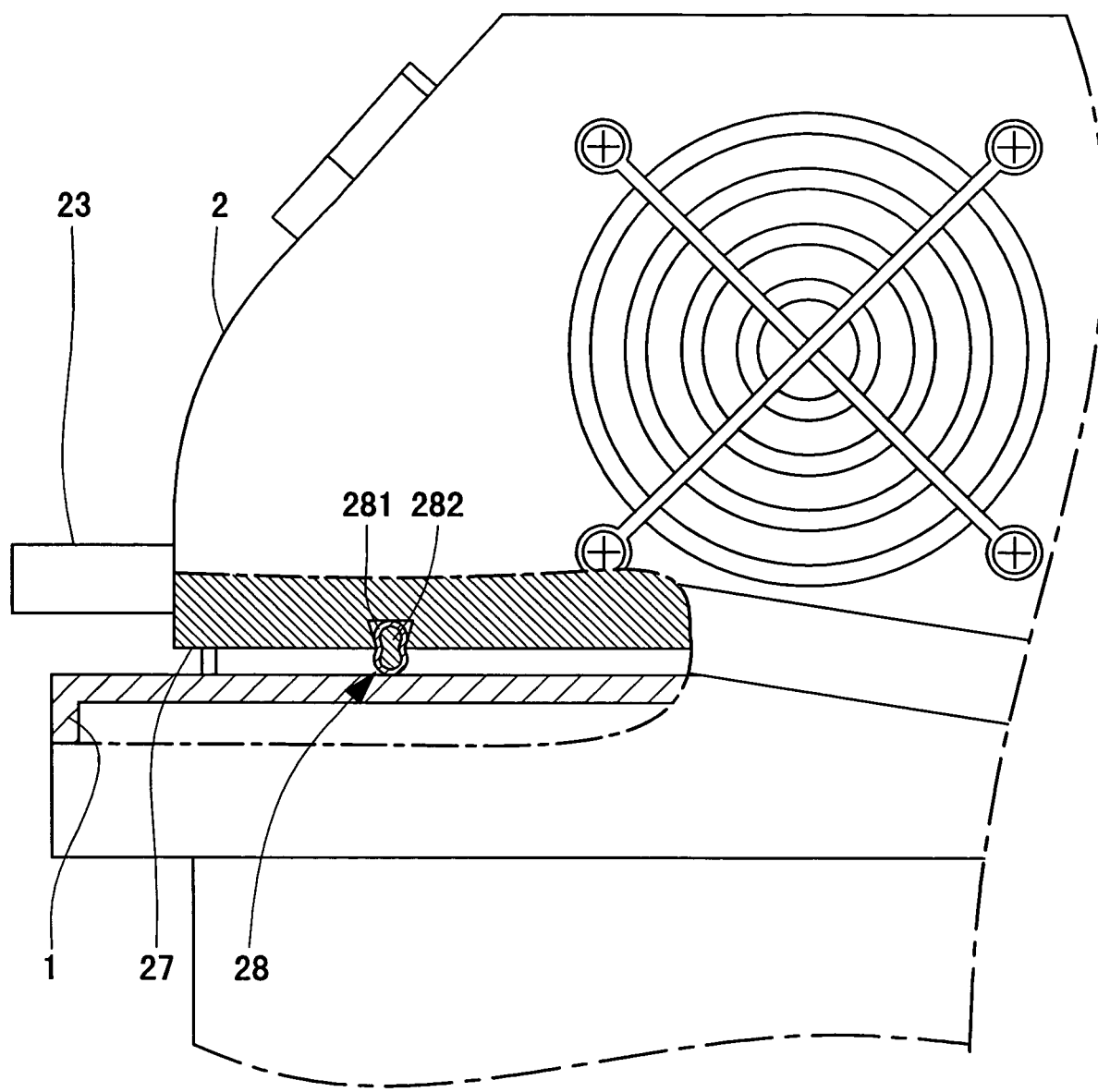
FIG. 5 is an enlarged side view, partly sectioned, of a portion of the combined microwave/frying apparatus in accordance with the present invention.

Referring to FIGS. 4 and 5, an insulating member 28 is provided to a perimeter of a bottom side 27 of the body 20 of the microwave-generating device 2 for preventing leakage of the microwaves. The insulating member 28 may include a soft plastic material 282 enclosed by a microwave leakproof material 281. The insulating member 28 provides a sealing effect to form a sealed frying space without the risk of leakage of microwaves. At least one exhaust hole 26 (FIG. 4) is defined in the bottom side 27 and communicated with an exhaust pipe (not shown) for discharging smoke generated during frying.

As illustrated in FIG. 4, an engaging member 29 is provided on the body 20 of the microwave-generating device 2 for releasably engaging with an engaging hole 19 in the housing 11 of the frying device 1. Thus, the body 20 of the microwave-generating device 2 can be retained in the closed position. A button (not shown) can be provided on the handle 23 for disengaging the engaging member 29 from the engaging hole 19.

Figure 7:
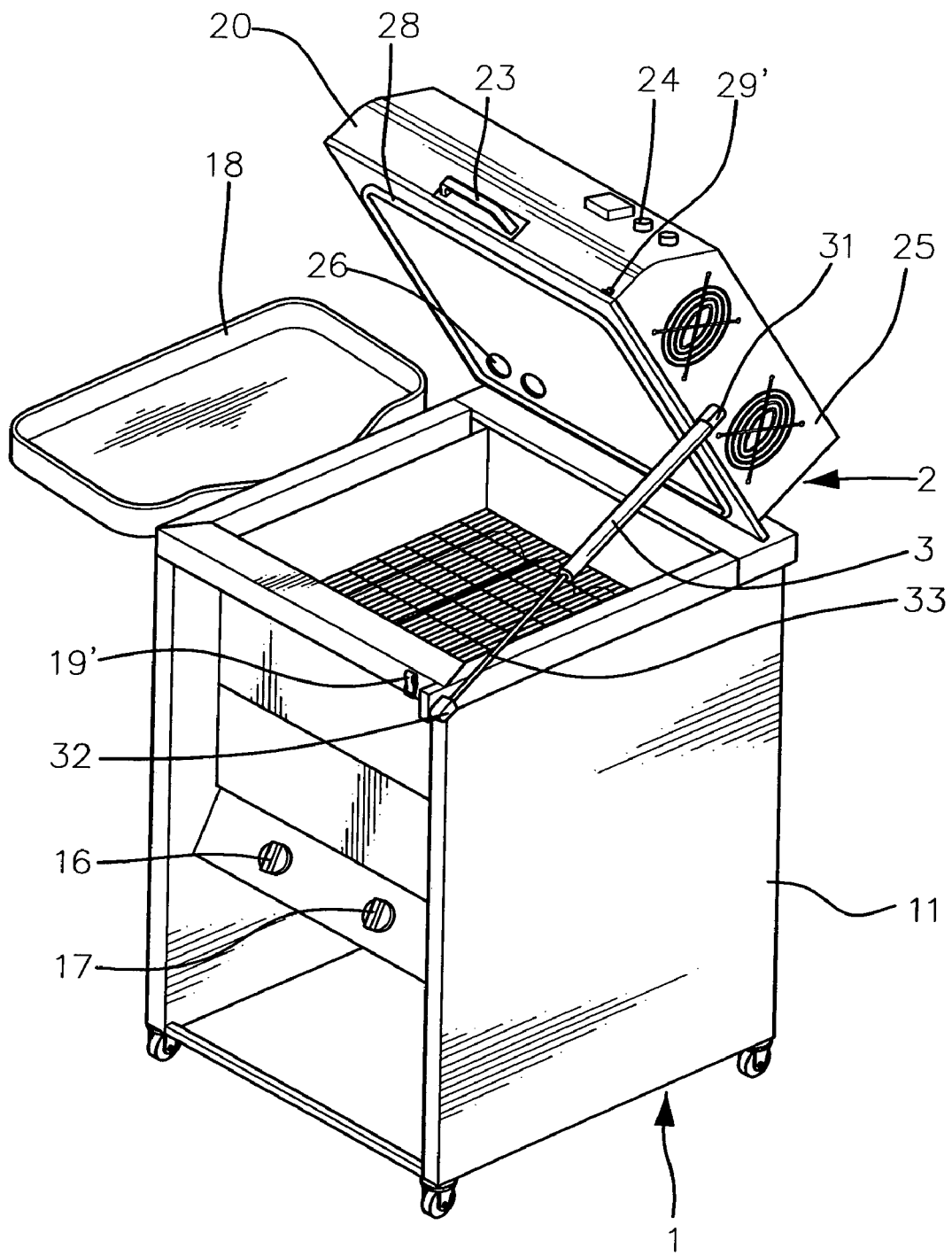
FIG. 7 is a perspective view similar to FIG. 6, wherein the combined microwave/frying apparatus is in an open state.

FIGS. 6 and 7 illustrate a modified embodiment of the present invention. In this embodiment, the telescopic rod 3 includes a first rod 31 having an end pivoted to an intermediate portion of a side of the housing 11 of the frying device 1 and a second rod 33 having a first end slidingly received in the first rod 31 and a second end 32 pivoted to a front portion of a side of the body 20 of the microwave-generating device 2. Thus, the telescopic rod 3 may support the body 20 of the microwave-generating device 2 in an open position, as in the first embodiment. Further, an engaging member 19' is mounted to the housing 11 of the frying device 1 for releasably engaging with an engaging member 29' mounted to the body 20 of the microwave-generating device 2.

Although the invention has been explained in relation to its preferred embodiment, it is to be understood that many other possible modifications and variations can be made without departing from the scope of the invention as hereinafter claimed.

What is claimed is:

1. A combined microwave/frying apparatus, comprising:
    a frying device including a housing having an oil groove in an upper end thereof, the oil groove having an upwardly facing opening;
    a microwave-generating device including a body having a rear end pivotally connected to a top of the housing, allowing the body to pivot relative to the housing of the frying device between an open position and a closed position, the microwave-generating device generating microwaves for heating food that is being fried in oil in the oil groove; and
    a telescopic pneumatic rod for supporting the body of the microwave-generating device in the open position.

2. The combined microwave/frying apparatus as claimed in claim 1, wherein the telescopic pneumatic rod includes a first rod having an end pivoted to a an intermediate portion of a side of the housing of the frying device and a second rod having a first end slidingly received in the first rod and a second end pivoted to a front portion of a side of the body of the microwave-generating device.

3. The combined microwave/frying apparatus as claimed in claim 1, wherein the telescopic pneumatic rod includes a first rod having an end pivoted to an intermediate portion of a side of the body of the microwave-generating device and a second rod having a first end slidingly received in the first rod and a second end pivoted to a front portion of a side of the housing of the frying device.

4. The combined microwave/frying apparatus as claimed in claim 1, wherein the body of the microwave-generating device includes a handle.

5. The combined microwave/frying apparatus as claimed in claim 1, further including means for retaining the body of the microwave-generating device in the closed position.

6. The combined microwave/frying apparatus as claimed in claim 1, further including means for preventing leakage of microwaves when the body of the microwave-generating device is in the closed position.

7. A combined microwave/frying apparatus, comprising:
    a frying device including a housing having an oil groove in an upper end thereof, the oil groove having an upwardly facing opening;
    a microwave-generating device including a body having a rear end pivotally connected to a top of the housing, allowing the body to pivot relative to the housing of the frying device between an open position and a closed position, the body having a bottom side facing the oil groove, the microwave-generating device generating microwaves for heating food that is being fried in oil in the oil groove;
    an insulating member mounted to the bottom side of the body for preventing leakage of the microwaves when the body of the microwave-generating device is in the closed position; and
    a telescopic pneumatic rod for supporting the body of the microwave-generating device in the open position.

8. The combined microwave/frying apparatus as claimed in claim 7, wherein the body of the microwave-generating device includes a handle.

9. The combined microwave/frying apparatus as claimed in claim 7, further including means for retaining the body of the microwave-generating device in the closed position.

10. The combined microwave/frying apparatus as claimed in claim 7, wherein the insulating member includes a soft plastic material enclosed by a microwave leakproof material.

11. The combined microwave/frying apparatus as claimed in claim 7, wherein the frying device further includes a plurality of heating tubes mounted in the oil groove.

12. The combined microwave/frying apparatus as claimed in claim 7, wherein the bottom side of the body of the microwave-generating device includes at least one exhaust hole.

13. A combined microwave/frying apparatus, comprising:
   a frying device including a housing having an oil groove in an upper end thereof, the oil groove having an upwardly facing opening;
   a microwave-generating device including a body having a rear end pivotally connected to a top of the housing, allowing the body to pivot relative to the housing of the frying device between an open position and a closed position, the microwave-generating device generating microwaves for heating food that is being fried in oil in the oil groove;
   a supporting member for supporting the body of the microwave-generating device in the open position; and
   means for preventing leakage of microwaves when the body of the microwave-generating device is in the closed position.

14. The combined microwave/flying apparatus as claimed in claim 13, wherein the body of the microwave-generating device includes a handle.

15. The combined microwave/frying apparatus as claimed in claim 13, further including means for retaining the body of the microwave-generating device in the closed position.

* * * * *